(12) United States Patent
Chen et al.

(10) Patent No.: US 7,283,466 B1
(45) Date of Patent: Oct. 16, 2007

(54) TRACKING PHYSICAL ROUTE CHANGES IN OPTICAL SWITCHING NETWORK

(75) Inventors: Wen Chen, San Jose, CA (US); Xin Li, San Jose, CA (US); Makarand Bhatambarekar, San Jose, CA (US)

(73) Assignee: Ciena Corporation, Linthicum, MD (US)

(*) Notice: Subject to any disclaimer, the term of this patent is extended or adjusted under 35 U.S.C. 154(b) by 1051 days.

(21) Appl. No.: 10/280,896

(22) Filed: Oct. 25, 2002

(51) Int. Cl.
    *G01R 31/08* (2006.01)
(52) U.S. Cl. ..................... 370/225; 370/242
(58) Field of Classification Search ........ 370/225–228, 370/242–245
    See application file for complete search history.

(56) References Cited

U.S. PATENT DOCUMENTS

| 6,898,187 | B2* | 5/2005 | Perlman et al. ............. 370/252 |
| 6,992,978 | B1* | 1/2006 | Humblet et al. ............. 370/228 |
| 7,016,300 | B2* | 3/2006 | Luft et al. .................. 370/221 |
| 7,082,124 | B1* | 7/2006 | Katukam .................... 370/357 |
| 2001/0032271 | A1* | 10/2001 | Allen ........................ 709/239 |
| 2003/0126299 | A1* | 7/2003 | Shah-Heydari ............. 709/252 |
| 2003/0161304 | A1* | 8/2003 | deBoer et al. .............. 370/386 |
| 2006/0036892 | A1* | 2/2006 | Sunna ........................ 714/4 |

* cited by examiner

*Primary Examiner*—Brian Nguyen
(74) *Attorney, Agent, or Firm*—Clements Walker; Christopher L. Bernard; Tyler S. Brown

(57) ABSTRACT

A method and system for tracking physical route changes in an optical switching network. One embodiment comprises a method for detecting changes in physical routes of connections within an optical switching network. The method includes receiving an event message from a node of the optical switching network where the event message relates to an event at the node, applying a filtering function to the event message to determine whether the event message may be ignored, ignoring the event message if the event message does not pass the filtering function, and processing the event message if the event message passes the filtering function.

36 Claims, 12 Drawing Sheets

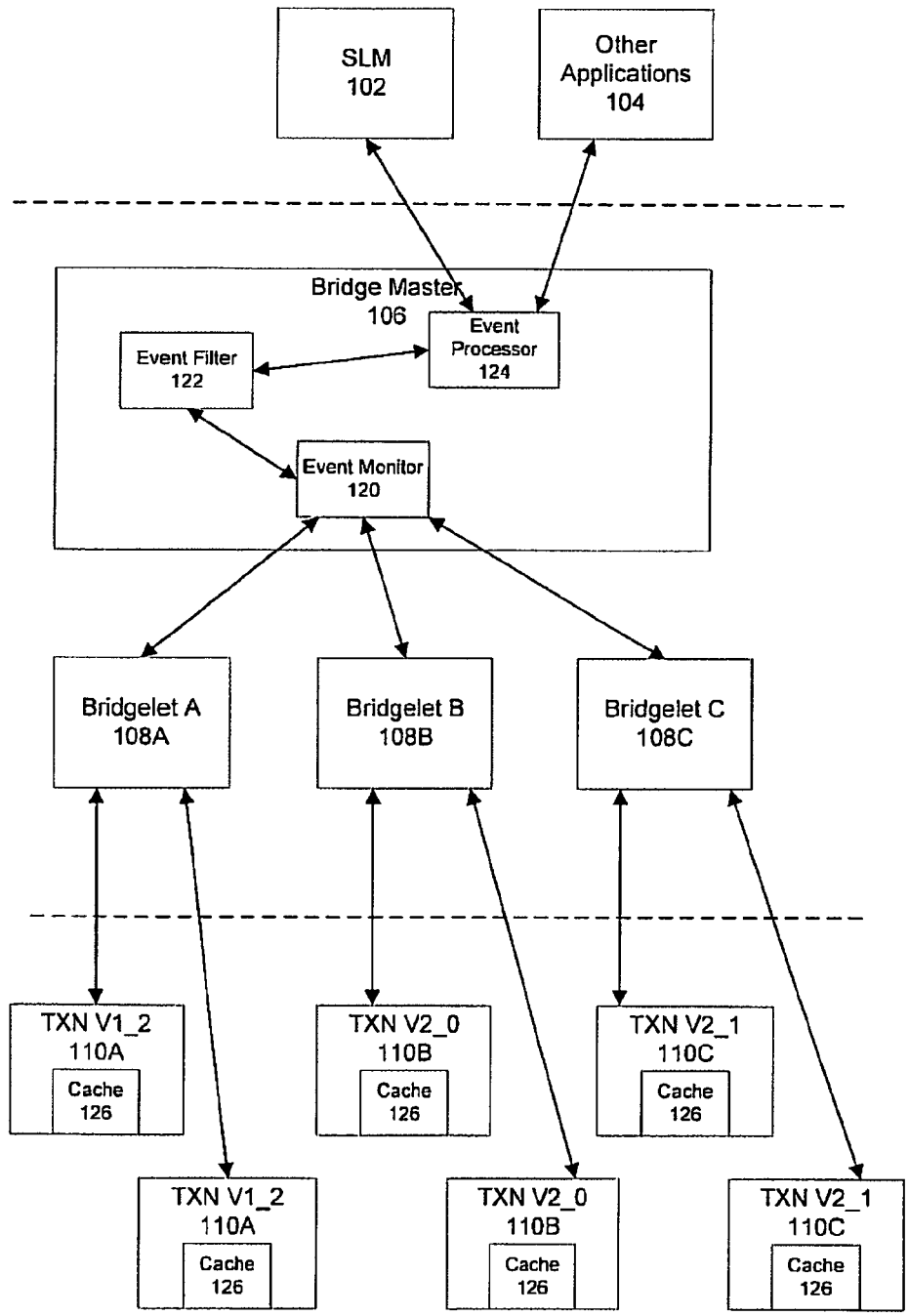
FIG. 1    100

TRACKING PHYSICAL ROUTE CHANGES IN OPTICAL SWITCHING NETWORK

BACKGROUND OF THE INVENTION

1. Field of the Invention

The present invention relates generally to telecommunications. More particularly, the invention relates to optical switching networks.

2. Description of the Background Art

Traditional telecommunication networking technologies were designed for a world of moderate traffic growth with relatively stable and predictable traffic patterns. Such systems were simply not designed to handle the explosive growth in bandwidth demand coupled with the dynamic nature of traffic patterns created by emerging broadband, Internet, and wireless applications. As telecommunication service providers discovered, efforts to scale networks through brute force application of legacy technologies have resulted in escalating capital and operating costs that outpace revenue growth.

Such a dramatic shift in the environment requires a fundamental shift in network architectures in order to realize the full potential of modern applications. Service providers are now demanding more intelligent optical switching networks with unconstrained scalability, agility, and efficiency essential for sustained success in an increasingly challenging environment.

However, because intelligent optical switching networks automatically re-route connections within the network, the actual physical routes being utilized by the logical connections becomes less transparent from the point-of-view of the telecommunication carriers and network operators. This obscuring of the physical routes makes it more difficult to provide functionalities, such as those related to service level management and fault management.

BRIEF DESCRIPTION OF THE DRAWINGS

FIG. 1 is a diagram depicting a network architecture in accordance with one embodiment of the present invention.

DETAILED DESCRIPTION

Figure 2A:
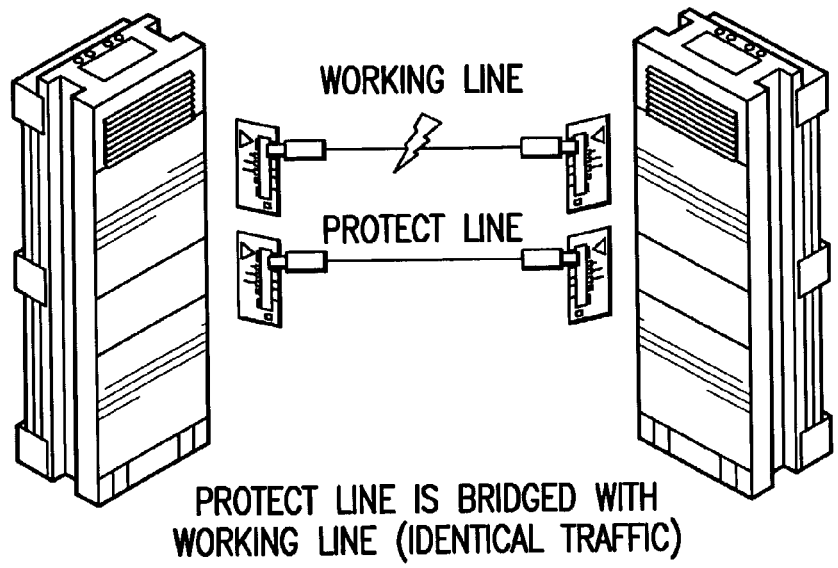
FIGS. 2A and 2B are schematic diagrams illustrating span-only protection schemes.

Recently, important technological advances have been made in adding intelligent optical switches to telecommunications networks. The intelligent optical networking switches may be, for example, CoreDirector™ switches available from CIENA Corporation with a place of business at 1201 Winterson Road, Linthicum, Md. 21090 (hereinafter referred to as "CIENA"). The CoreDirector™ switch is designed to rapidly deliver a wide range of differentiable end-to-end optical capacity across the network, with operational simplicity and flexible protection techniques.

Of particular significance for this invention, the protection techniques enabled by intelligent optical switches provide for the automatic re-routing of connections in the event of a failure or degradation of one or more physical links. This automatic re-routing increases the robustness of the connections in the network. However, the automatic re-routing also creates substantial difficulties and challenges in determining the actual physical links being used for a logical connection at a point in time. The actual physical route being used for a logical connection will vary from time to time in a complex manner that depends on the activation of the protection schemes within the intelligent optical switching network.

The present invention provides a method and system for detecting changes in the actual physical routes being used in intelligent optical switching networks. Embodiments of the present invention are described below in relation to the figures.

FIG. 1 is a diagram depicting a network architecture in accordance with one embodiment of the present invention. The network architecture of FIG. 1 is an illustrative example. The present invention may also be implemented with other architectures. For example, the functionalities of the Bridge Master 106 and Bridgelets 108 may be incorporated in the Applications (102 and 104). As another example, the functionalities of the Bridge Master 106 and Bridgelets 108 may be combined into a single module.

In the architecture of FIG. 1, the application level includes applications such as a service level manager (SLM) 102 and other applications 104. The SLM 102 monitors the status of services on the network. Hence, it is desirable for the SLM 102 to receive notification of change in a service, for example, when a physical route of the service changes. Similarly, other applications may utilize such notifications. Such other applications may include, for example, administration, monitoring, and data extraction tools.

In this architecture, such notifications are provided to the application layer by a bridge layer between the application layer and the node layer. In one embodiment, the bridge layer includes a Bridge Master module 106. Here, the Bridge Master 106 effectively provides a single resource that provides such notifications to the various applications of the application layer.

The node layer includes various cross-connect switches (TXN). The TXN may comprise, for example, CIENA CoreDirector™ switches. These TXN may be running different versions of its operating software. For example, some TXN 110A may be running version 1.2, other TXN 110B may be running version 2.0, and still other TXN 110C may be running version 2.1 of the software. In order to communicate properly with each of these versions, there are multiple Bridgelet modules 108. For example, as illustrated, one Bridgelet 108A may communicate with all TXN 110A running version 1.2, another Bridgelet 108B may communicate with all TXN 10B running version 2.0, and yet another Bridgelet 108C may communicate with all TXN 110C running version 2.1. In accordance with an embodiment of the invention, each TXN or node includes a cache 126.

In accordance with one embodiment of the invention, the bridge master 106 includes an event monitor 120, an event filter 122, and an event processor 124. The event monitor 120 is operatively coupled to the TXN in the node layer by way of the bridgelets 108. Alternatively, multiple event monitors 120, or components thereof, may be implemented in the bridgelets 108 (instead of a single event monitor 120 in the bridge master 106). The event monitor 120 receives event messages from the nodes. The event filter 122 is operatively connected to the event monitor 120. Alternatively, the event filter 122 may be implemented in the bridgelets 108 (instead of a single event filter 122 in the bridge master 106). The event filter 122 filters the event messages to determine whether the event messages may be ignored and ignores those event messages that do not pass the filtering. The event processor 124 is operatively connected to the event filter 122. The event processor 124 is operatively connected to applications in the application layer (for example, SLM 102 and other applications 104). The event processor 124 processes the event messages that pass the filtering of the event filter 122. In an alternative embodiment, the functionality of the event monitor 120, event filter 122, and/or event processor 124, or parts thereof may be implemented in the applications in the application layer.

For explanatory reasons, examples of protection schemes in intelligent optical switching networks are now described as follows in relation to FIGS. 2A, 2B, 3A, and 3B. Note that the present invention is not meant to be limited to these example protection schemes. The invention may also be used in relation with other protection schemes.

Figure 2B:
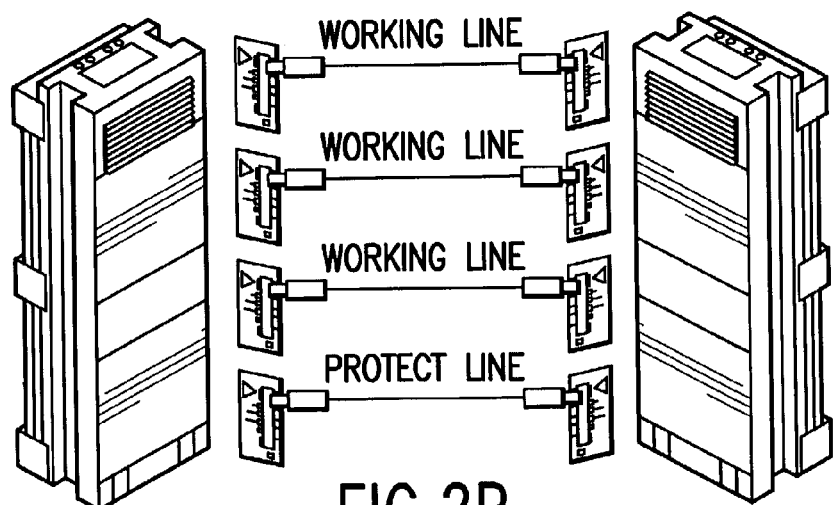

FIGS. 2A and 2B are schematic diagrams illustrating span-only protection schemes. The particular span-only protection schemes illustrated are 1+1 and 1:N Automatic Protection Switching (APS) protection schemes. These APS protection schemes are specific embodiments of span-only protection schemes.

FIG. 2A depicts an APS Linear 1+1 Protection. In 1+1 APS protection, working traffic is sent on both working and protect lines. Hence, the protect line cannot be used for lower priority traffic. A transmitting node transmits two identical signals over the two lines while the receiving node determines the better of the two received signals and uses that better signal.

The bottom portion of FIG. 2B depicts the APS 1:N Protection. In the 1:N APS protection, the protect line may be used for extra traffic when the protection is not activated. If the protection is activated, then the extra traffic is preempted by the traffic that is re-routed from a failed working line to the protect line.

Figure 3A:
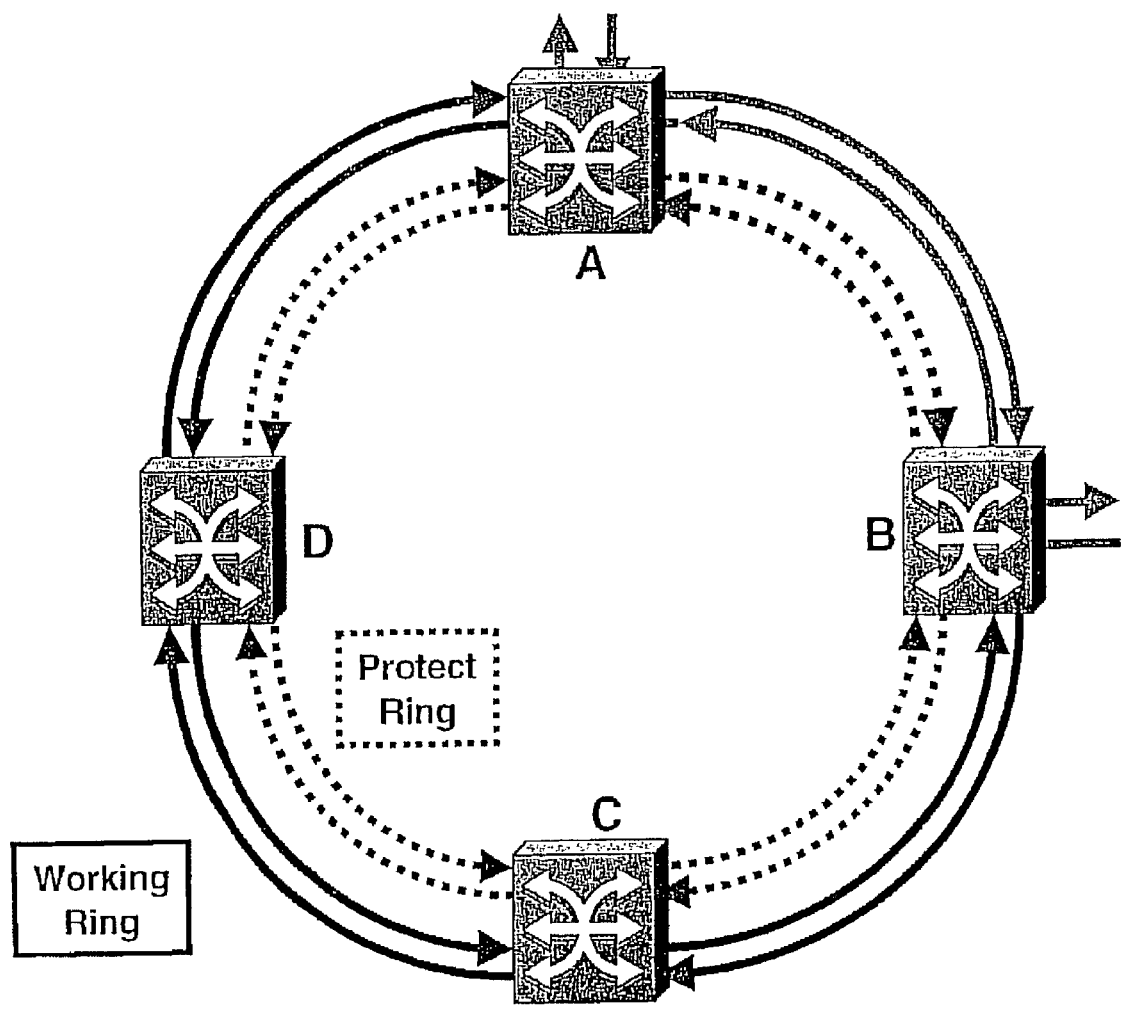
FIG. 3A is a schematic diagram illustrating working and protect rings under a ring/span protection scheme.

FIG. 3A is a schematic diagram illustrating working and protect rings under a ring/span protection scheme. A ring/span protection scheme has both ring switching and span switching capabilities. The particular ring/span protection scheme illustrated is a type of 4-fiber BLSR (bi-directional line switched ring) protection scheme. CIENA's robust implementation of 4-fiber BLSR is called VLSR™ (Virtual Line Switched Ring). Although BLSR type protection schemes are referred to in this detailed description, the inventive concepts extend beyond this particular implementation and encompass any protection scheme. As depicted, the ring includes four fibers between each node. A first fiber pair is working (solid lines), and a second fiber pair is protect (dashed lines). In the BLSR type protection, a ring of up to 16 nodes may be supported. Each connecting span contains at least one working line with a corresponding protect line in a one-to-one ratio. The protection groups are configured on each node of the ring. In the example illustrated, there is a connection going over the working link from node A to node B.

Figure 3B:
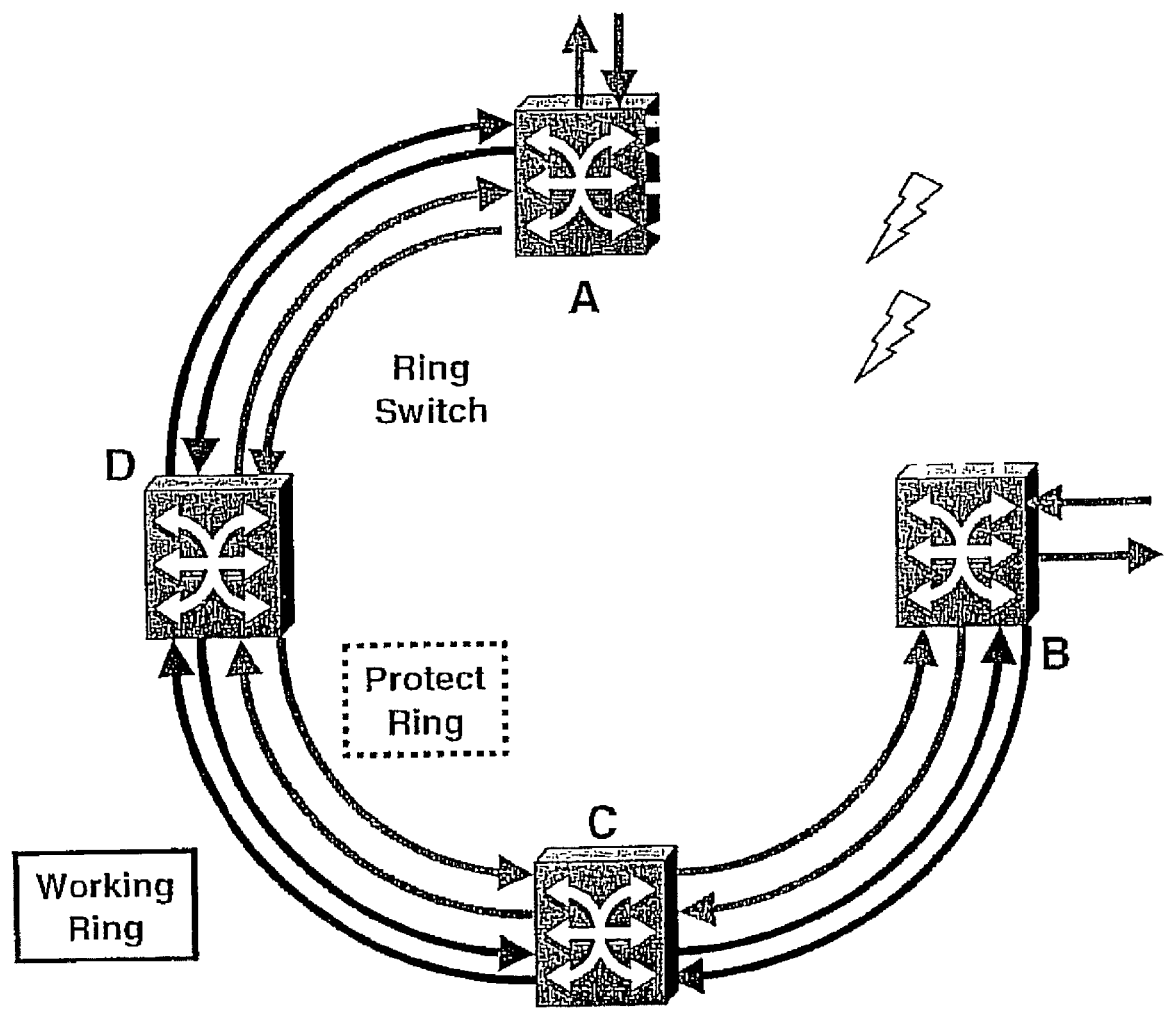
FIG. 3B is a schematic diagram illustrating activation of a protect ring.

FIG. 3B is a schematic diagram illustrating activation of a protect ring. The protect ring illustrated is under the BLSR type protection scheme. In the example shown, the span between nodes A and B is broken. For example, break may be a physical break of the fibers or other disruption. This results in activation of the ring protection. With the activation of a ring switch, the traffic formerly carried on the working lines between A and B now loops back on protect lines from Node A to Node D, then from Node D to Node C, then from Node C to Node B.

On the other hand, if only the working lines, but not the protect lines, between nodes A and B were broken, then a span switch (not a ring switch) would be activated. The span switch would involve moving traffic between A and B to the protect line pair (instead of the broken working line pair).

Figure 4:
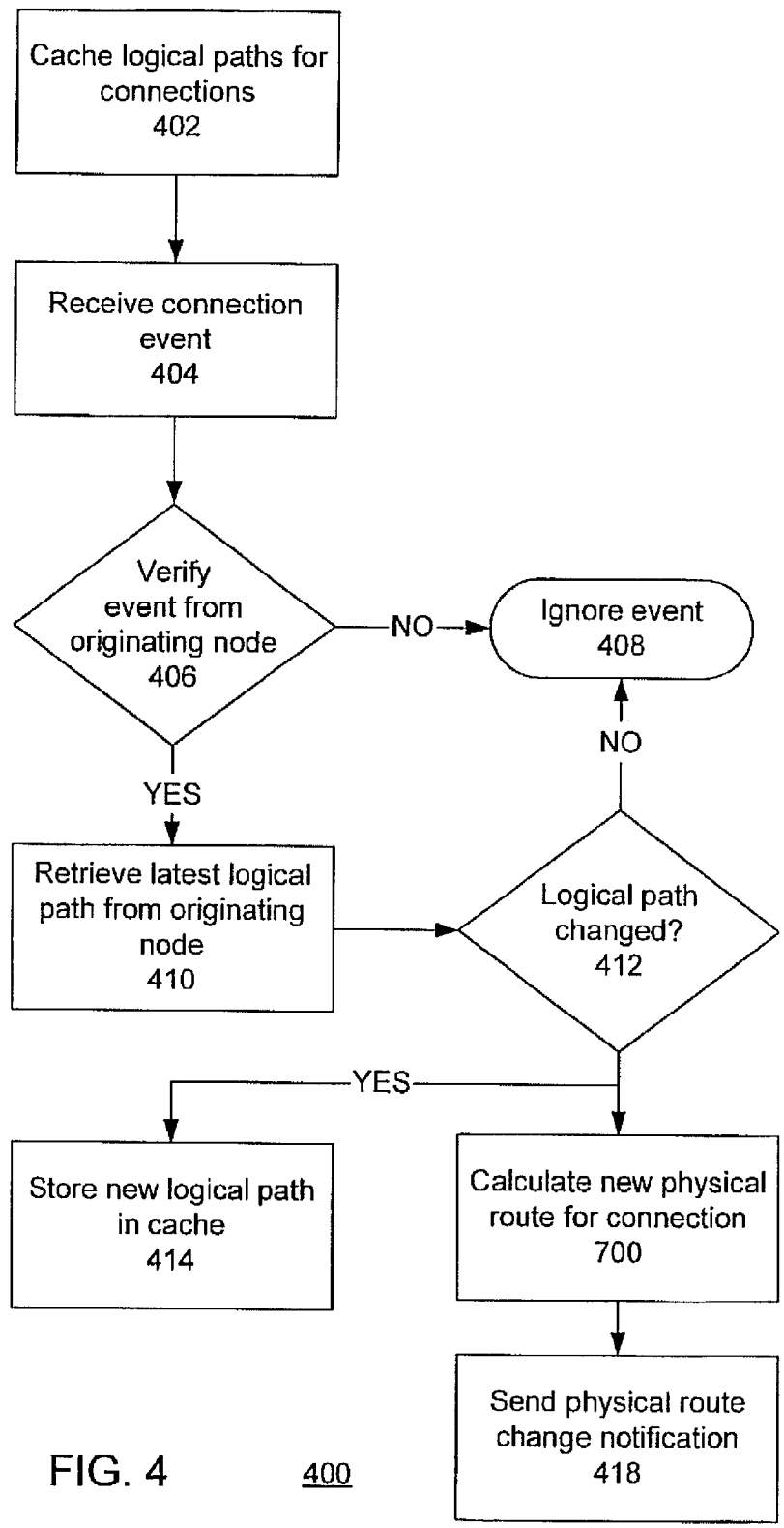
FIG. 4 is a flow chart depicting a method for detecting route changes from a connection event in accordance with an embodiment of the invention.

FIG. 4 is a flow chart depicting a method for detecting route changes from a connection event in accordance with an embodiment of the invention. The method 400 as depicted includes nine steps (402, 404, 406, 408, 410, 412, 414, 700, and 418).

A connection event is an event relating to a change in a subnetwork connection ("SNC"). An SNC is a logical grouping of one or more paths that pass through a network element in the network. A signaling and routing protocol (e.g., OSRP) is used to route, establish and maintain one or more sub-network connections in a given network element. The sub-network connections are characterized as path-based or composite. Path-based SNCs can include one or more synchronous transport signals (STS-1). A composite SNC can include multiple paths. Sub-network connections define a temporary (e.g., over a short period of time, where the connection is set-up and torn down at each call) allocation of resources in the network. SNCs are provisioned when a call is made.

The routing for a SNC can be explicitly or automatically defined. Provisioning of SNCs is provided through a signaling and routing protocol (e.g., OSRP). Explicitly provisioned SNCs include user (e.g., system administrator)-defined routes. Automatically provisioned SNCs make use of a routing protocol for computing an optimal route. In either case, the route information is transmitted to other network elements in the network and cross-connects associated with the routes are configured.

The SNCs are said to be temporary in that, resources associated with the route (e.g., bandwidth) can be dynamically re-allocated along the path. The reconfiguration includes the clearing of the set up connection (e.g., freeing the resources at a given node). Network resources associated with the SNCs are dynamically reconfigurable. Accordingly, the failure at a single point along the path from an ingress network to an egress network element defining the route will not result in unused and unavailable resources. In one implementation, a user can configure one or more of the following parameters associated with a SNC, including: a local line on which the SNC originates, the identification (ID) of the network element on which the SNC terminates, the ID of the remote line on which the SNC terminates, a class of service, a maximum allowable delay, route setting including working and protection routes, preferred status, mesh restorability, revert configurations upon fail over and reversion timers.

In this embodiment, connection events may be referred to as SNC events. For example, SNC events may include various types of events such as SNC creation events, SNC deletion events, SNC attribute change events, and SNC state change events. An SNC creation event involves creation of a new SNC. An SNC deletion event involves deletion of an existing SNC. An SNC attribute change event involves modification of an attribute of an existing SNC. For example, an attribute change may involve the modification of a logical path (for example, working designated transit list or DTL) for the SNC. A working DTL includes a current list of nodes that logically connects the two end points of the SNC. An SNC state change event involves modification of a state of an existing SNC. For example, a state change may involve an SNC going from a working state to a non-working state (for example, due to a fiber cut).

The first step 402 represents the caching of logical paths (for example, working DTLs) for the connections. This caching is performed in data storage that is accessible by the bridge layer software. The caches are kept up-to-date as described below.

In the second step 404, a connection event is received by the bridge layer software from a switch in the optical switching network. In one implementation, the switches may be CoreDirector™ switches. However, the scope of the invention is applicable beyond CoreDirector™ switches to any type of network element or node which is configured to detect and transmit connection events.

In the third step 406, verification is made by the bridge layer software that the connection event is from the originating node (i.e. the originating switch) of the connection. When a change occurs in a connection, corresponding connection events may be sent from both originating and terminating nodes of the connection. An embodiment of the invention suppresses (ignores) events from terminating nodes in order to advantageously reduce redundancy in the method. Hence, if the connection event is not from the originating node, then the event is from a terminating node and such an event is ignored in the fourth step 408. If the connection event is from the originating node, then the process 400 goes onto the fifth step 410.

In the fifth step 410, the latest logical path for the connection is retrieved by the bridge layer software from the originating node. In one implementation, the latest logical path comprises a latest working designated transit list (DTL).

In the sixth step 412, a determination is made by the bridge layer software as to whether the logical path has changed. This determination is made by comparing the latest logical path for the connection against the cached logical path for the connection. For example, if the logical path is given by a working DTL, then the list of nodes in the working DTL are compared with the list of nodes in the cache. If the logical path for the connection has not changed, then the event is ignored. On the other hand, if the logical path has changed, then the process 400 goes onto the seventh 414 and eighth 700 steps.

In the seventh step 414, the new logical path is stored in the cache that is accessible to the bridge layer software. In the eighth step 700 (that in this embodiment may be done in parallel with the seventh step 414), a new physical route for the connection is calculated by the bridge layer software. In one embodiment, the new physical route for the connection may be calculated in accordance with the method 700 described in FIG. 7. Following the eighth step 700, a notification that the physical route for the connection has changed is transmitted in the ninth step 418 from the bridge layer software to an application in the application layer. For example, the notification may be sent to a network management system- (NMS-) type application, such as a component of CIENA's ON-Center™ Network Management Suite software (e.g., ON-Center™'s Service Level Manager 102).

Figure 5:
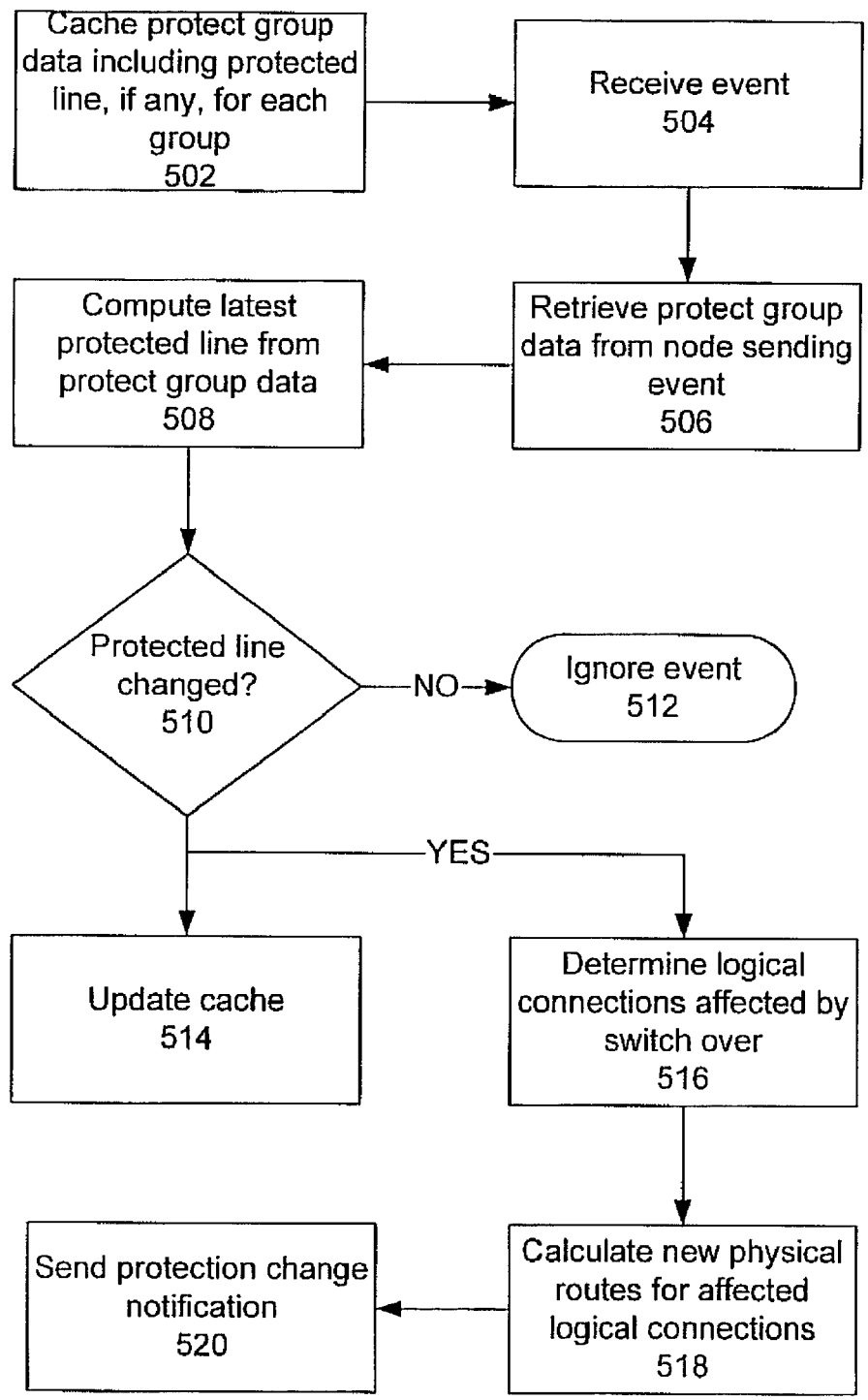
FIG. 5 is a flow chart depicting a method for detecting route changes due to an event from a span-only protection scheme in accordance with an embodiment of the invention.

FIG. 5 is a flow chart depicting a method for detecting route changes due to an event from a span-only protection scheme in accordance with an embodiment of the invention. The method 500 as depicted includes ten steps (502, 504, 506, 508, 510, 512, 514, 516, 518, and 520). This embodiment of method 500 is described below in relation to a implementation of a span-only protection scheme, such as Automatic Protection Switching (APS). The methodology of FIG. 5 may also be applied to other similar protection schemes.

In the first step 502, the APS group data for each node is cached at an APS group data cache that is accessible by the bridge layer software. The APS group data includes the working lines and protect line in each group. From the group data, a determination may be made as to which, if any, of the working lines is being actively protected by the protect line. If a working line is being actively protected by the protect line, then that working line may be called the protected line. In one implementation, the protected line, if any, for each group is stored in the cache.

In the second step 504, the bridge layer software receives an APS event from a node. The APS event may indicate, for example, the activation of an APS switch (in which one of the working lines in a group becomes a protected line). In one embodiment, such an activation of an APS switch generates four APS events: one from each of two ends of the working line being protected and one from each of two ends of the protect line. One advantage of this method 500 is that redundant events are ignored (if an earlier received event has already informed the bridge layer software about the APS switch over.)

In the third step 506, the bridge layer software retrieves the APS group data from the node that sent the APS event. In the fourth step 508, the bridge layer software computes the latest protected line from the APS group data.

In a fifth step 510, the bridge layer software compares the latest protected line against the cached protected line for that APS group. If the protected line has not changed (i.e. the latest protected line is the same as the cached protected line), then in the sixth step 512 the APS event is ignored by the bridge layer software. On the other hand, if the protected line has changed (i.e. the latest protected line is different from the cached protected line), then the process 500 goes on to the seventh 514 and eighth 516 steps. In the seventh step 514, the bridge layer software updates the APS group data cache with the APS group data retrieved from the node. In the eighth step 516, the bridge layer software determines which logical connections are affected by the APS switch over. For example, if a particular working line became a protected line, then at least the logical connections being carried on that working line are affected in that their physical working routes have changed. In the ninth step 518, the bridge layer software calculates a new physical route for the affected connections. In one embodiment, the new physical route for each affected connection may be calculated in accordance with the method 700 described in FIG. 7. Following the ninth step 518, a notification that the physical routes for the affected connections have changed is transmitted by the bridge layer software to an application in the application layer in the tenth step 520. The notification may be sent to a network management type application, such as, for example, a service level manager.

Figure 6A:
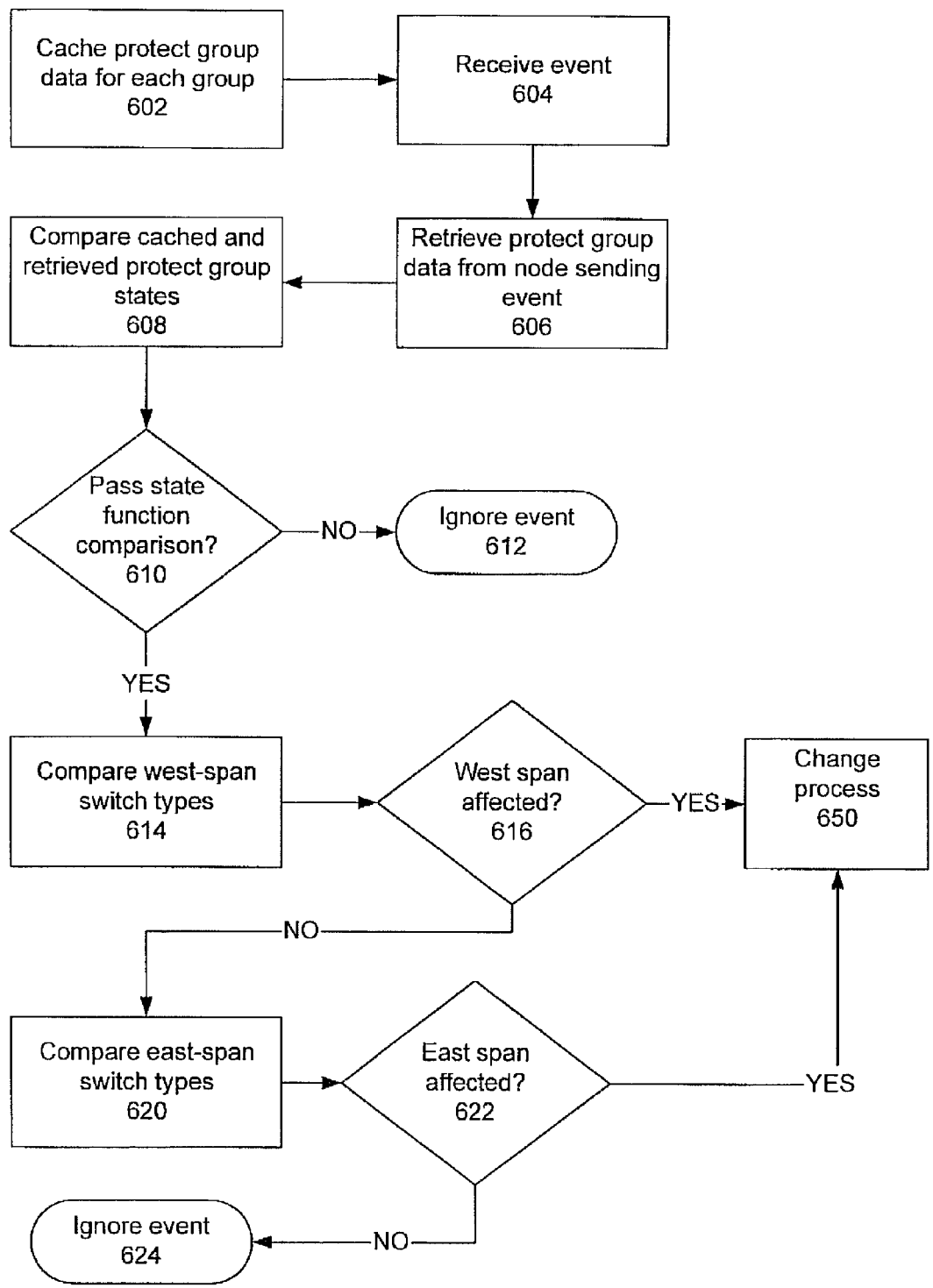
FIGS. 6A and 6B are flow charts depicting a method for detecting route changes due to an event from a ring/span protection scheme in accordance with an embodiment of the invention.
Figure 6B:
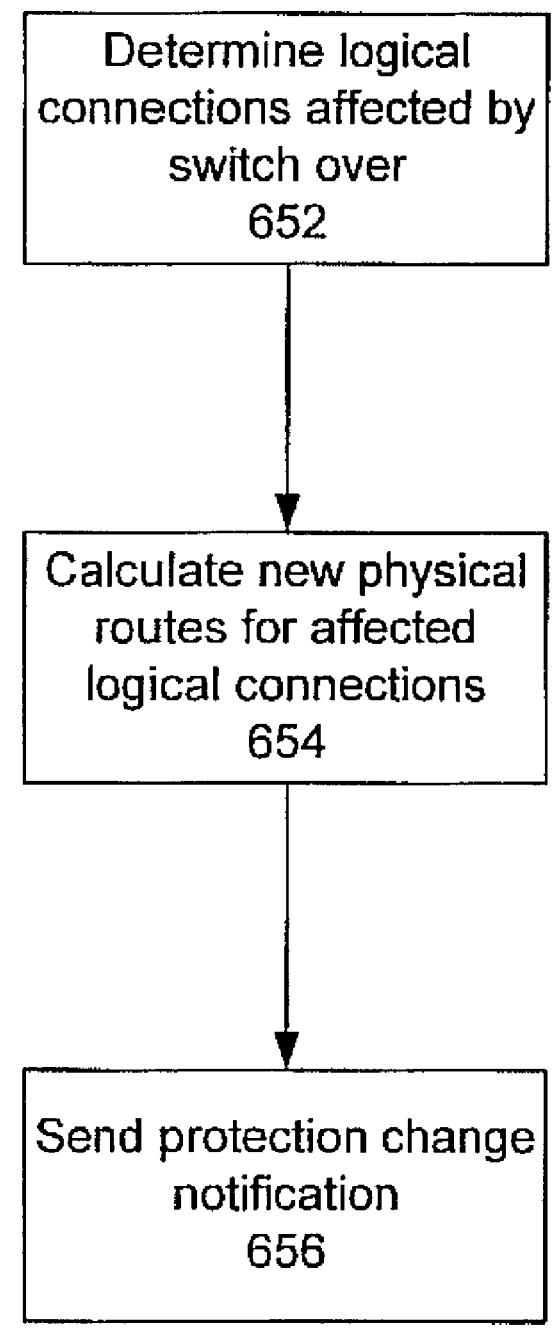

FIGS. 6A and 6B are flow charts depicting a method for detecting route changes due to an event from a ring/span protection scheme in accordance with an embodiment of the invention. The method 600 as depicted in FIG. 6A includes twelve steps (602, 604, 606, 608, 610, 612, 614, 616, 618, 620, 622, and 624). The embodiment of the method 600 is described below in relation to a implementation of a ring/span protection scheme, such as the BLSR type protection scheme. Nevertheless, the methodology of FIG. 6A may also be applied to other similar protection schemes.

In the first step 602, the BLSR type protect group (PG) data for each node is cached at a protect group data cache that is accessible by the bridge layer software. The protect group data various data relating to each protect group. In one embodiment, the data includes a PG state and switch types for "east" (right side) and "west" (left side) spans of each node of the group. In addition to the steps described below, the PG data cache is kept updated at the node in accordance with an embodiment of the invention.

In the second step 604, a BLSR type event is received from a node by the bridge layer software. The event may indicate, for example, the activation of a span switch or the activation of a ring switch.

In the third step 606, the bridge layer software retrieves the protect group data is retrieved from the node that sent the BLSR type event. As mentioned above, the node may be, for example, a CIENA CoreDirector™ switch, but the inventive concepts may be implemented in other switces or nodes. In one embodiment, the protect group data may include the latest PG state and the latest switch types for east and west spans of the node.

In the fourth step 608, the bridge layer software compares the retrieved PG state with the cached PG state for that group. In one embodiment, the PG state comparison is made in accordance with the following table, where the cached PG state determines the row and the retrieved PG state determines the column of a cell in the table.

| Cached State\Retrieved State | Idle | Local Protect Switch | Other |
|---|---|---|---|
| Idle | No Pass | Pass | No Pass |
| Local Protect Switch | Pass | Pass | Pass |
| Other | No Pass | Pass | No Pass |

In a first example of a Pass of this comparison test, if the cached state indicates idle and the retrieved state indicates local protect switch, then a Pass is determined from the data at the first row and second column of the table. In this case, a change in the protect switching (in this case, a new protect switch) is clearly indicated. In a second example, if the cached state indicates local protect switch and the retrieved state indicates idle, then a Pass is determined by the data at the second row and first column of the table. In this case, a change in the protect switching (in this case, the end of a protect switch) is clearly indicated. In a third example, if both the cached and retrieved states indicate local protect switch, then the comparison test is still passed (see the Pass at the second row and second column). However, in this case, a change in the protect switching may or may not have occurred. A change may have occurred if the protect switching changed from protecting a first line to protecting a different line. On the other hand, a change may not have occurred.

In an example of a No Pass of the comparison test, the cached state may be idle and the retrieved state may be "other" (other than idle or local protect switch). In this case, no change of the protect switching is indicated. Examples of "other" states may include, for example, pass-through events that indicate a remote switch over event and do not indicate a local switch over event.

In the fifth step 610, the bridge layer software makes a determination as to whether the comparison test is passed. If the test is not passed, then in the sixth step 612 the event is ignored. Advantageously, this avoids unnecessary computation when redundant events or events that do not change physical routes are received by the system. If the test is passed, then the process 600 proceeds to the seventh step 614.

In the seventh step 614, the bridge layer software compares the retrieved west-span switch with the cached west-span switch type for that group at that node. In one embodiment, the switch type comparison is made in accordance with the following table, where the cached switch type determines the row and the retrieved switch type determines the column of a cell in the table.

| Cached Type\Retrieved Type | None | Redundant | Wait-to-Restore | Span Switch | Ring Switch |
|---|---|---|---|---|---|
| None | | | | yes | Yes |
| Redundant | yes | | | yes | Yes |
| Wait-to-Restore | yes | | | yes | Yes |
| Span Switch | yes | | | | Yes |
| Ring Switch | yes | | | yes | |

In the above table, a yes indicates that the comparison test determined that the protection has been affected in that the activated protection of that span has changed. As indicated in the above table, in one embodiment the switch types may include none, redundant, wait-to-restore, span switch, and ring switch. None indicates that there is no active protect switch on that particular local span. A redundant type indicates that an active protect switch is scheduled to happen but has not yet been activated. The redundant type may be used, for example, to reserve the protect line for the protect switch. A wait-to-restore type may indicate, for example, that a broken line has been repaired and that the system is waiting to restore that line as a working line. The span switch indicates that a span switch is active for that particular local span. The ring switch indicates that a ring switch is active for that particular local span.

In the eighth step 616, the bridge layer software makes a determination as to whether the west-span switch type comparison test indicated that the west span protection was affected in that the activated protection of that span has changed. If it was affected, then a change process is performed in the ninth step 650. The change process 650 is described in further detail below in relation to FIG. 6B. Otherwise, the method 600 continues to the tenth step 620.

In the tenth step 620, the bridge layer software compares the retrieved east-span switch type with the cached east-span switch type for that group at that node. The ninth step 618 may be done in an analogous way to the seventh step 614, but the ninth step 618 operates in relation to the east span rather than the west span.

In the eleventh step 622, a determination is made by the bridge layer software as to whether the east-span switch type comparison test indicated that the east span was affected. If it was affected, then the process 600 loops back and the change process is performed in the ninth step 650. Otherwise, the method 600 continues to the twelfth step 624 in which the event is ignored.

FIG. 6B is a flow chart depicting the change process 650 that is incorporated as a step in FIG. 6A. As depicted, the change process 650 includes three steps (652, 654, and 656).

In the first step 652, a determination is made by the bridge layer software as to which logical connections are affected by the BLSR type switch over. For example, if a particular working line was broken and so activated the BLSR type protection, then at least the logical connections being carried on that working line are affected in that their physical working routes have changed.

In the second step 654, the bridge layer software calculates a new physical route for the affected connections. In one embodiment, the new physical route for each affected connection may be calculated in accordance with the method 700 described in FIG. 7. Following the second step 654, a notification that the physical routes for the affected connections have changed is transmitted from the bridge layer software to an application in the application layer in the third step 656. For instance, the notification may be sent to a network management type application, such as, for example, a service level manager 102.

Figure 7:
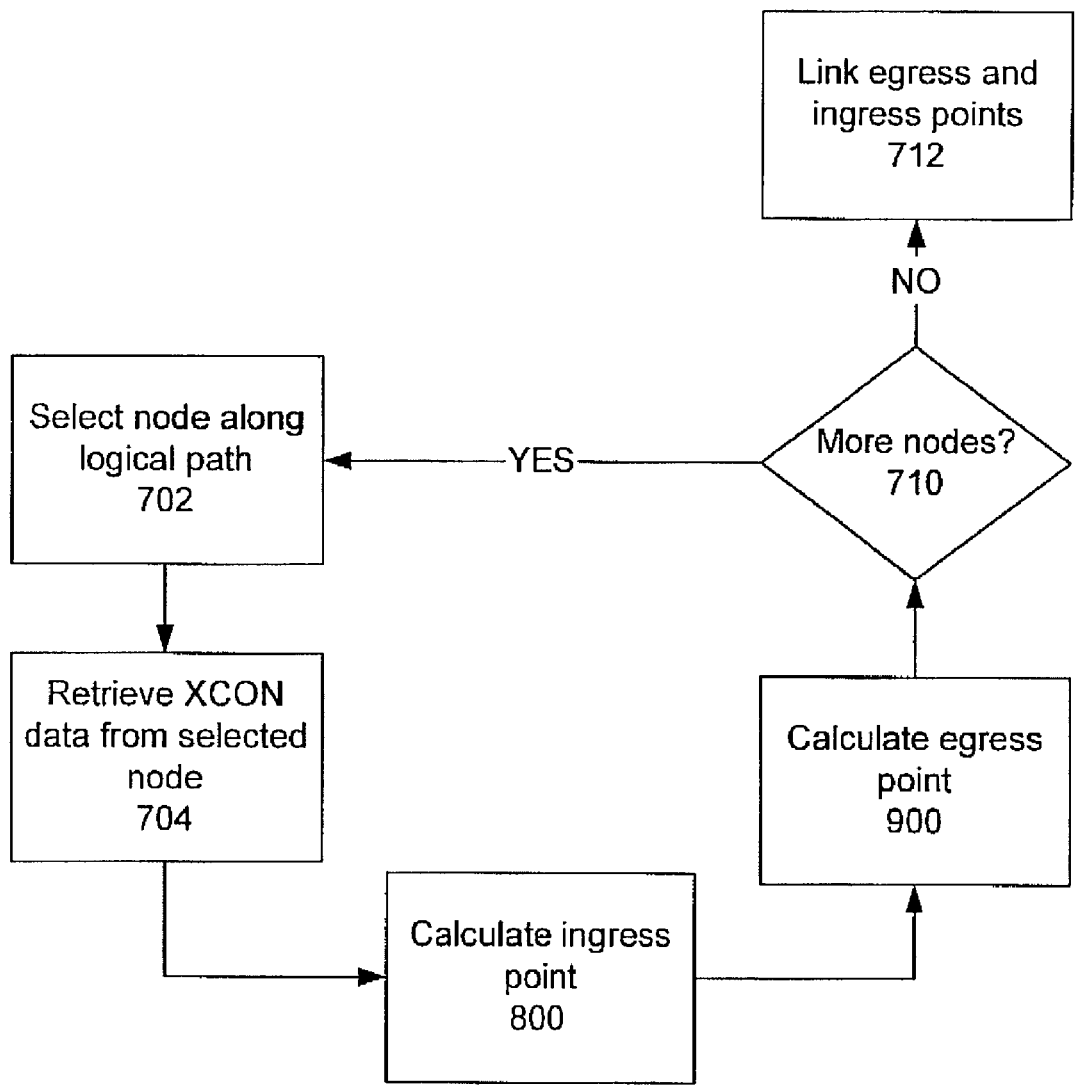
FIG. 7 is a flow chart depicting a method for calculating a physical working route for a logical connection in accordance with an embodiment of the invention.

FIG. 7 is a flow chart depicting a method for calculating a physical working route for a logical connection in accordance with an embodiment of the invention. Such a calculation may be performed, for example, by the bridge layer software. The method 700 as depicted includes six steps (702, 704, 800, 900, 710, and 712).

In the first step 702, one of the nodes along the logical path is selected or considered. The set of nodes along the logical path include the originating node, the terminating node, and the nodes in between them along the path.

In the second step 704 a cross-connect (abbreviated as XCON) data set for the connection of interest is retrieved from the selected node. The XCON data set retrieved in this step 704 includes ingress and egress related information for the connection of interest. In accordance with an embodiment of the invention, the XCON data set for the connection is retrieved from amongst multiple XCON data sets for multiple connections going through the node. In a specific embodiment, the particular XCON data set may be identified for retrieval by matching a name field with that of an originating XCON data set.

In the third step 800, a calculation or determination is made of the ingress point for the logical connection at the node. The ingress point needs to be calculated or determined because various protection schemes may re-route the actual physical connection to different ingress points depending on the working state of the network. In one embodiment, the ingress point may comprise an ingress port at the node. This step 800 is described in more detail below in relation to FIG. 8.

In the fourth step 900, a calculation or determination is made of the egress point for the logical connection at the node. Like the ingress point, the egress point needs to be calculated or determined because various protection schemes may re-route the actual physical connection to different egress points depending on the working state of the network. In one embodiment, the egress point may comprise an egress port at the node. This step 900 is described in more detail below in relation to FIG. 9.

In the fifth step 710, a determination is made as to whether more nodes along the logical path need to be selected or considered. If so, the method 700 loops back to the first step 702. Otherwise, the method 700 goes on to the sixth step 712.

Finally, in the sixth step 712, the calculated egress and ingress points are linked appropriately to form the physical working route. Basically, except for the terminating node, each node's egress point is linked to the ingress point of the next node along the logical working path. (Or, equivalently, except for the originating node, each node's ingress point is linked to the egress point of the preceding node along the logical working path.)

As described above, the calculated working route may comprise the calculated ingress and egress points for the nodes along the logical path. These calculations take into account the activation of protection schemes that may re-route the physical working path.

Figure 8:
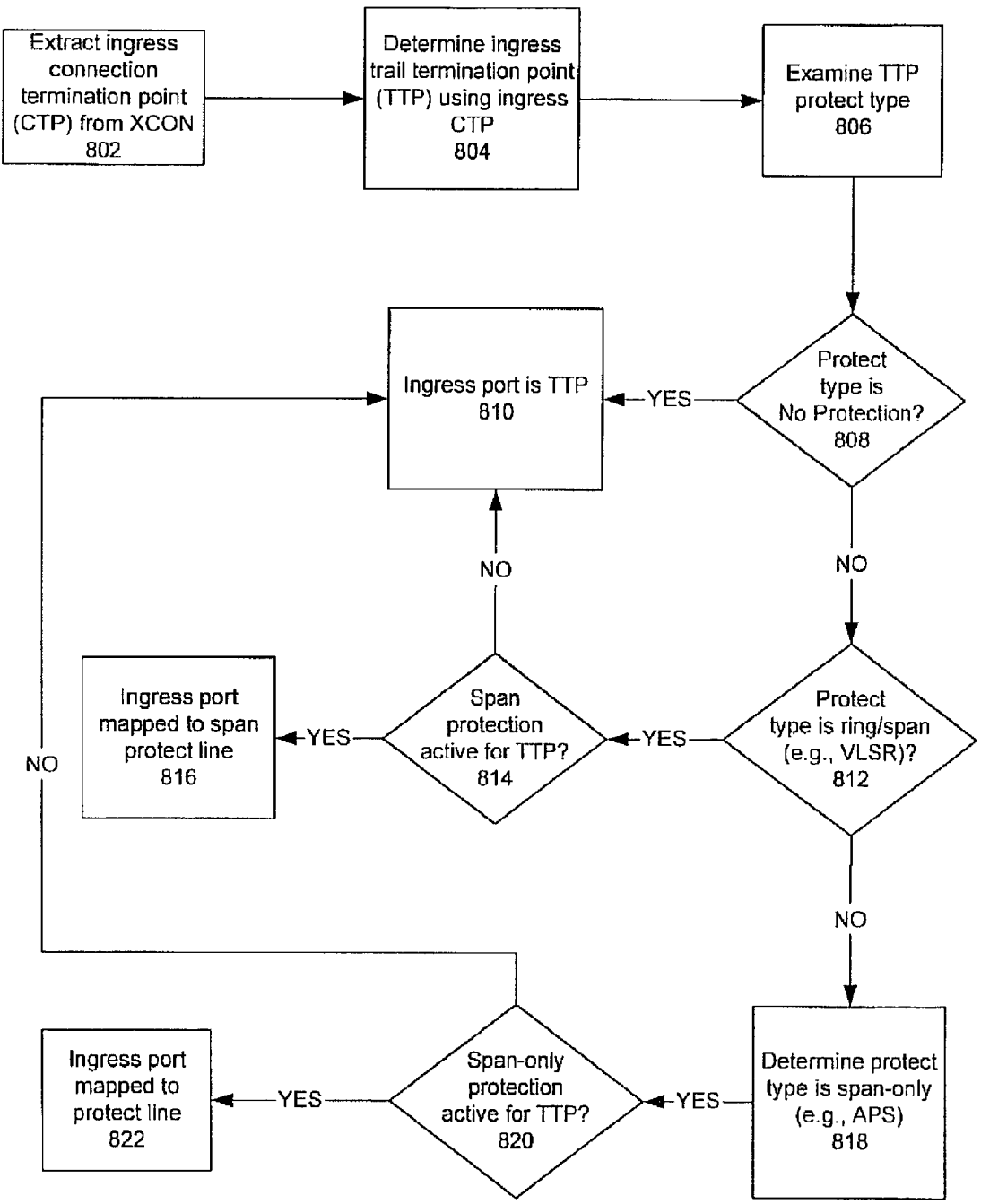
FIG. 8 is a flow chart depicting a method for calculating an ingress point for a node in accordance with an embodiment of the invention.

FIG. 8 is a flow chart depicting a method for calculating an ingress point for a node in accordance with an embodiment of the invention. Such a calculation may be performed, for example, by the bridge layer software. The ingress point needs to be calculated because it may change depending on activation of a protection scheme. The method 800 as depicted includes eleven steps (802, 804, 806, 808, 810, 812, 814, 816, 818, 820, and 822).

In the first step 802, the ingress connection termination point (CTP) is extracted from the XCON data set for the node. From a CTP, the channels (e.g., timeslots) for the connection may be found. A node should have one ingress CTP and one egress CTP for each connection. A CTP may or may not be part of a group termination point (GTP). If a CTP is part of a GTP, then the GTP is extracted, and the GTP gives the contained CTPs.

In the second step 804, the ingress trail termination point (TTP) is determined using the ingress CTP. A TTP comprises a logical termination point that may correspond to different physical termination points depending on the activation of protection schemes. In a specific embodiment, the logical TTP may be found from a supporting termination point field of the CTP.

In the third step 806, a protect type field of the ingress TTP is examined. The protect type indicates whether the TTP is covered by any protection scheme.

In the fourth step 808, if the protect type indicates no protection is covering the ingress TTP, then the method 800 proceeds to the fifth step 810. Otherwise, the method 800 moves on to the sixth step 812 described below. In the fifth step 810, since no protection is covering the ingress TTP, the ingress point may be determined in a straightforward manner. In a specific embodiment, the ingress port may comprise the TTP port.

In the sixth step 812, if the protect type indicates a ring/span type of protection is covering the ingress TTP, then the method 800 proceeds to the seventh step 814. Otherwise, the method 800 moves on to the ninth step 816 described below. In one specific embodiment, the ring/span type of protection comprises the VLSR™ protection. A span may be defined as a transmission facility between two nodes. A ring may be defined as a configuration of nodes connected in a circular or cyclical fashion.

In the seventh step 814, a determination is made as to whether or not the span protection is active. Here, because we are considering the ingress point, we are concerned with span protection and not ring protection. In other words, the ingress point is affected by an active span protection, but it is not affected by an active ring protection. In one specific embodiment, the logical TTP may be used to identify a protect unit (PU) for the TTP and, if applicable, a protect group (PG) containing the PU. A span state field of the PU may then be examined to determine whether the span protection is idle or active. If the span protection is idle, then the method 800 goes back to the fifth step 810, wherein the ingress port is mapped to the TTP port. If the span protection is active, then the method 800 proceeds to the eighth step 816. In the eighth step 816, the ingress port is mapped to the port of the span protect line of the PU.

In the ninth step 818, the protect type may be determined to be a span-only type of protection covering the ingress TTP. This may be assumed if there are only two types of protection (ring/span and span-only types). Otherwise, this determination may be made by examination of the protect type field. In one specific embodiment, the span-only type of protection may comprise the APS protection. In other embodiments, the span-only type of protection may comprise other span protection schemes.

In the tenth step 820, a determination is made as to whether or not the span-only protection is active. In one specific embodiment, the logical TTP may be used to identify a protect line for the TTP. (For example, the protect line may be assigned solely to the TTP in CIENA's APS 1+1 protection scheme, or the protect line may be shared amongst TTPs in a protect group in CIENA's APS 1:N protection scheme.) The protect line is then examined to confirm whether or not it is actively protecting the logical TTP. If the protection is not confirmed to be active, then the method 800 goes back to the fifth step 810, wherein the ingress port is mapped to the TTP port. If the protection is confirmed to be active, then the method 800 proceeds to the eleventh step 822. In the eleventh step 822, the ingress port is mapped to the port of the protect line.

Figure 9:
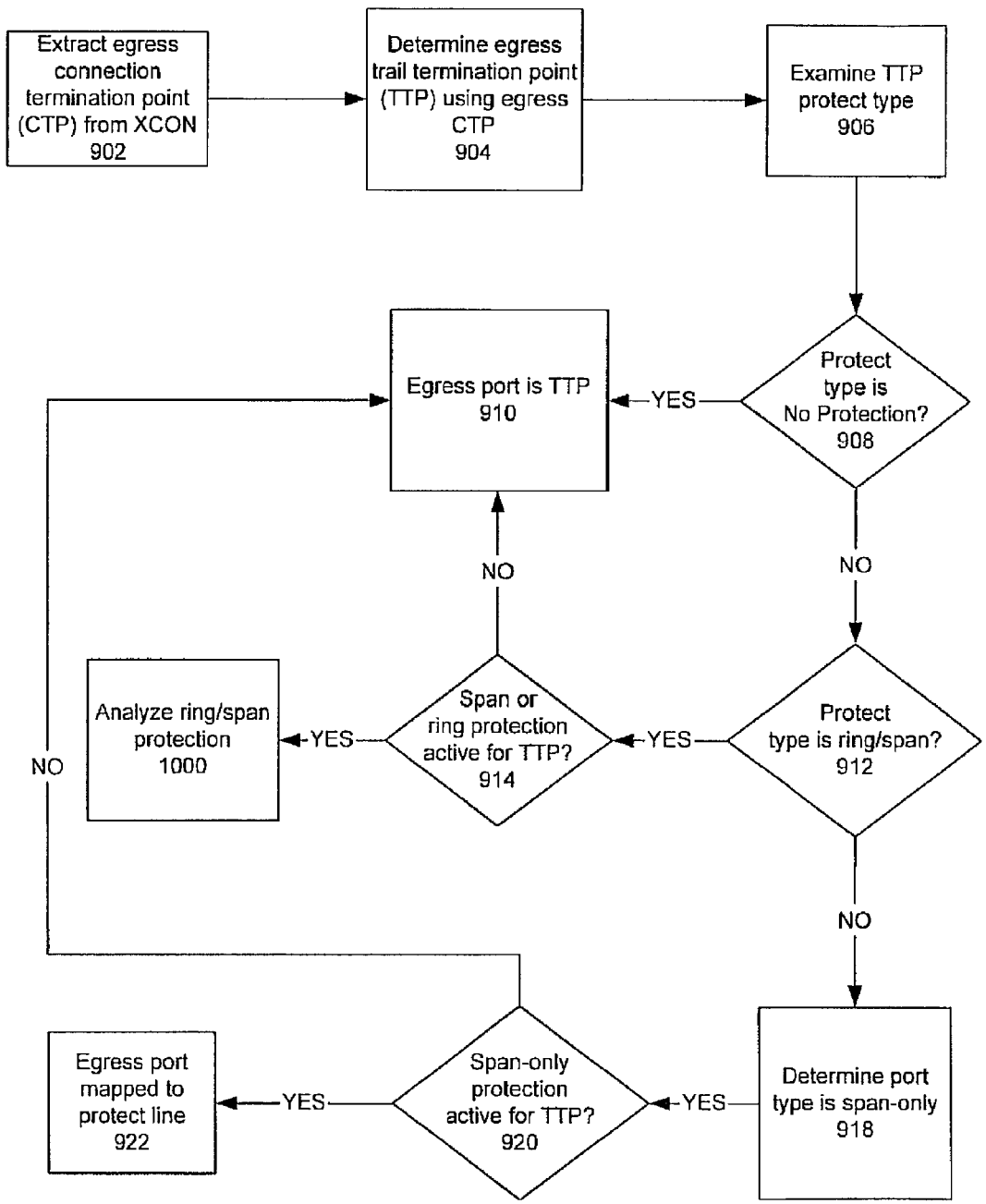
FIG. 9 is a flow chart depicting a method for calculating an egress point in accordance with an embodiment of the invention.

FIG. 9 is a flow chart depicting a method for calculating an egress point in accordance with an embodiment of the invention. Such a calculation may be performed, for example, by the bridge layer software. The egress point needs to be calculated because it may change depending on activation of a protection scheme. The method 900 as depicted includes eleven steps (902, 904, 906, 908, 910, 912, 914, 916, 918, 920, and 922).

In the first step 902, the egress connection termination point (CTP) is extracted from the XCON data set for the node. As stated above, from a CTP, the channels (e.g., timeslots) for the connection may be found. A CTP may or may not be part of a group termination point (GTP). If a CTP is part of a GTP, then the GTP is extracted, and the GTP gives the contained CTPs.

In the second step 904, the egress trail termination point (TTP) is determined using the egress CTP. As stated above, a TTP comprises a logical termination point that may correspond to different physical termination points depending on the activation of protection schemes. In a specific embodiment, the logical TTP may be found from a supporting termination point field of the CTP.

In the third step 906, a protect type field of the egress TTP is examined. The protect type indicates whether the TTP is covered by any protection scheme.

In the fourth step 908, if the protect type indicates no protection is covering the egress TTP, then the method 900 proceeds to the fifth step 910. Otherwise, the method 900 moves on to the sixth step 912 described below. In the fifth step 910, since no protection is covering the egress TTP, the egress point may be determined in a straightforward manner. In a specific embodiment, the egress port may comprise the TTP port.

In the sixth step 912, if the protect type indicates a ring/span type of protection is covering the egress TTP, then the method 900 proceeds to the seventh step 914. Otherwise, the method 900 moves on to the ninth step 916 described below. In one specific embodiment, the ring/span type of protection comprises the 4-ring BLSR type of protection.

In the seventh step 914, a determination is made as to whether either span or ring protection is active. Here, because we are considering the egress point, we are concerned with both span protection and ring protection. In other words, the egress point is affected by either an active span protection or an active ring protection. If neither the span or ring protection is active, then the method 900 goes back to the fifth step 910, wherein the egress port is mapped to the TTP port. If either the span or ring protection is active, then the method 900 proceeds to the eighth step 1000, wherein the VLSR protection may be analyzed. The analysis of the eighth step 1000 is described further below in relation to FIG. 10.

In the ninth step 918, the protect type may be determined to be a span-only type of protection covering the egress TTP. This may be assumed if there are only two types of protection (ring/span and span-only types). Otherwise, this determination may be made by examination of the protect type field. In one specific embodiment, the span-only type of protection may comprise the APS protection. In other embodiments, the span-only type of protection may comprise other span protection schemes.

In the tenth step 920, a determination is made as to whether or not the span-only protection is active. If the span-only protection is not active, then the method 900 goes back to the fifth step 910, wherein the egress port is mapped to the TTP port. If the span-only protection is active, then the method 900 proceeds to the eleventh step 922. In the eleventh step 922, the egress port is mapped to the port of the active protect line.

Figure 10:
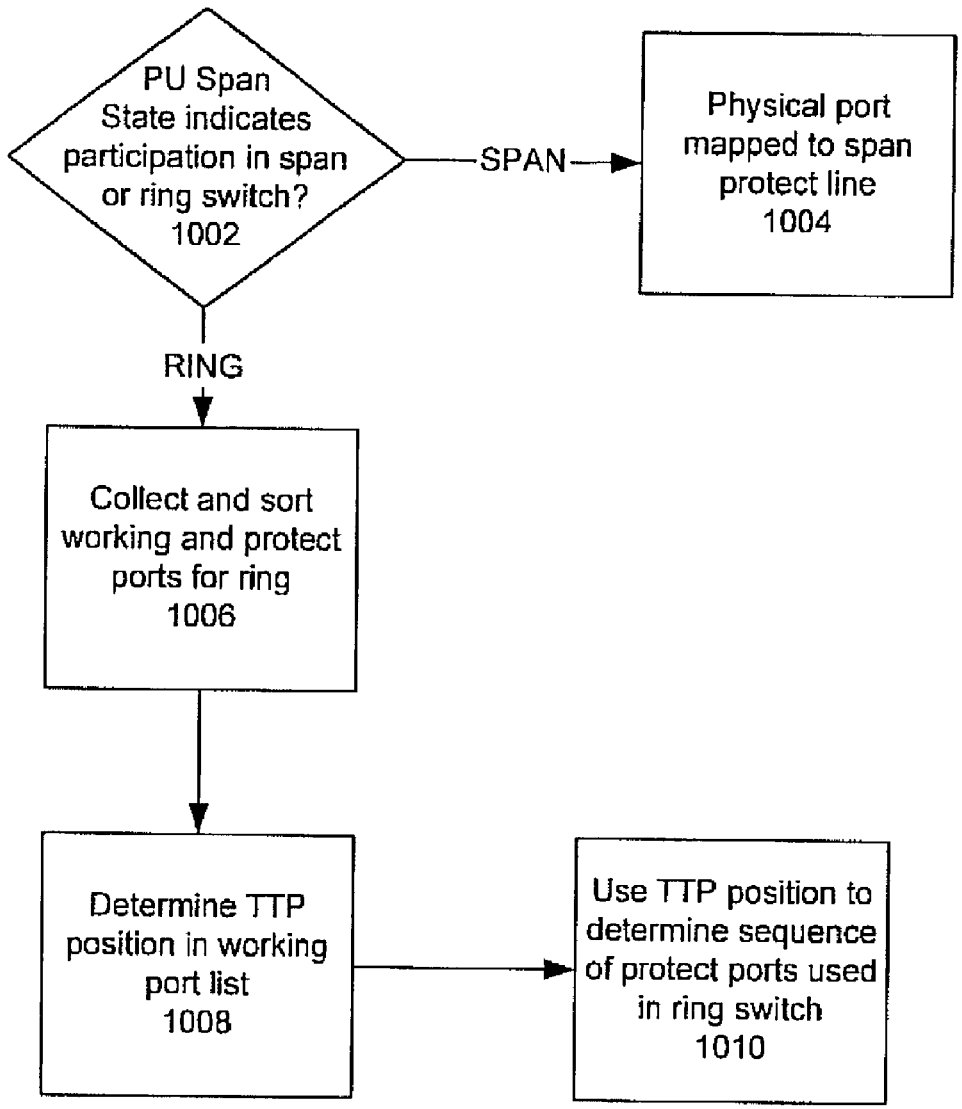
FIG. 10 is a flow chart depicting a method for analyzing a ring/span protection scheme in accordance with an embodiment of the invention.

FIG. 10 is a flow chart depicting a method for analyzing a ring/span protection scheme in accordance with an embodiment of the invention. Such analysis may be performed, for example, by the bridge layer software. The method may be applied, for example, as a step 1000 in calculating an egress point (see FIG. 9). The method 1000 as depicted includes five steps (1002, 1004, 1006, 1008, and 1010).

In accordance with a specific embodiment, it is confirmed prior to the method 1000 that the logical TTP is being actively protected by the ring/span protection scheme (see 914 in FIG. 9). Thereafter, in the first step 1002, the protect unit (PU) span state is examined to determine whether a span or ring switch is active.

If the span state indicates an active span switch, then the process 1000 goes to the second step 1004. In the second step 1004, the physical port is mapped to the span protect line. In the context of the method 900 of FIG. 9, this means that the egress point is mapped to the span protect line.

Otherwise, if the span state indicates an active ring switch, then the process 1000 goes to the third step 1006. In the third step 1006, working and protect ports for the ring are collected and sorted. Working and protect port lists may thus be created. The working and protect port lists may each comprise a linked lists of ports.

In the example illustrated in FIG. 2, the working port list may comprise this linked list: iwAew; iwBew; iwCew; iwDew. "iw" represents ingress working port. "ew" represents egress working port. "iwAew" represents the ingress working port for node A and the egress working port for node A. The linked list is cyclical in that the egress working port for node D links up to the ingress working port for node A. The connection illustrated in FIG. 2 has a working path going from the ingress working port of node A, to the egress working port of node A, to the ingress working port of node B, and finally to the egress working port of node B. Similarly, the protect port list may comprise this linked list: epAip; epBip; epCip; epDip. "ip" represents ingress protect port. "ep" represents egress protect port. "ipAep" represents the ingress protect port for node A and the egress protect port for node A. The linked list is cyclical in that the egress protect port for node D links up to the ingress protect port for node A.

In the fourth step 1008, the position of the logical TTP in the working port list is determined. In the example illustrated in FIG. 3, the working and protect links between nodes A and B are severed. In that case, the egress working port of node A ("Aew") indicates participation in a ring switch (in step 1002) and so (in step 1008) the TTP position for that port is determined in the working port list.

Finally, in the fifth step 1010, the TTP position in the working port list is used to determine the sequence of protect ports used in the ring switch. In one embodiment, the ring switch may go from the TTP position in the working port list to egress protect port on that node. In the example illustrated in FIG. 3, the ring switch would go from "Aew" (the working egress port of node A) to "epA" (the protect egress port of node A). Subsequently, the protect port list would be traversed in the opposite direction as the working port list was traversed. In our example, the working port list would be traversed from epA, to Dip, to epD, to Cip, to epC, to Bip. Thereafter, the physical route would switch back to the egress working port on that node, i.e. to Bew. In that way, the ring switch would re-establish the connection through the new physical route.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. In regards to the above description of methods, the term "step," "first step," "second step," and so on, may be used to described an aspect of the method for ease of reference. However, use of such term does not necessarily imply a specific order is required in order to practice a method in accordance with the invention.

For example, the intelligent optical switches of the preferred embodiment comprise just one type of network element that may be supported by the present invention. Furthermore, the optical switches may switch the optical signals using various mechanisms. For example, they may convert the optical signals to electronic signals, switch the electronic signals, then convert the electronic signals back to optical form. Alternatively, they may switch the optical signals themselves without the conversion to and from electronic form.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

List of Acronyms

SLM=service level manager

SNC=subnetwork connection

DTL=designated transit list

XCON=cross-connect

CTP=connection termination point

GTP=group termination point

TTP=trail termination point

PU=protect unit

PU=protect group

APS=Automatic Protection Switching

VLSR=Virtual Line Switched Ring

BLSR=Bi-directional Line Switched Ring

What is claimed is:

1. A method for detecting changes in physical routes of connections within an optical switching network, the method comprising:
   receiving an event message from a node of the optical switching network where the event message relates to an event at the node, and wherein the event comprises a connection event that relates to a specific connection that has an end point at the node;
   filtering the event message to determine whether the event message may be ignored; and
   ignoring the event message if the event message does not pass said filtering;
   processing the event message if the event message passes said filtering;
   retrieving a latest logical path for the specific connection from the node;
   comparing the latest logical path for the specific connection with a previously cached logical path for the specific connection to determine whether the latest logical path differs from the previously cached logical path; and
   indicating that the filtering is passed if a difference in the path is determined.

2. The method of claim 1, where the connection event comprises a subnetwork connection event.

3. The method of claim 2, wherein the subnetwork connection event comprises a creation event.

4. The method of claim 2, wherein the subnetwork connection event comprises a deletion event.

5. The method of claim 2, wherein the subnetwork connection event comprises an attribute change event.

6. The method of claim 1, wherein said filtering comprises:
   verifying that the event message is from an originating node for the specific connection.

7. The method of claim 1, wherein the processing comprises:
   calculating a new physical route for the specific connection based on the difference in the path.

8. The method of claim 7, wherein the processing further comprises:
   sending a physical route change notification relating to the specific connection to at least one application.

9. The method of claim 7, wherein the processing further comprises:
updating the cached logical path for the specific connection based on the difference in the path.

10. A method for detecting changes in physical routes of connections within an optical switching network, the method comprising:
receiving an event message from a node of the optical switching network where the event message relates to an event at the node, and the event comprises a protection event that relates to a protection scheme of the optical switching network;
filtering the event message to determine whether the event message may be ignored; and
ignoring the event message if the event message does not pass said filtering;
processing the event message if the event message passes said filtering;
retrieval of a latest protection data from the node;
comparison of the latest protection data with a previously cached protection data to determine whether the latest protection data differs from the previously cached protection data; and
indicating that the filtering is passed if a difference in the protection data is determined.

11. The method of claim 10, wherein the processing comprises:
determining a subset of connections affected by the event if the filtering is passed.

12. The method of claim 11, wherein the processing further comprises:
calculating new physical routes for the subset of connections based on the difference in the protection data.

13. The method of claim 12, wherein the processing further comprises:
sending notification of the new physical routes to at least one application.

14. The method of claim 10, wherein the processing further comprises:
updating the cached protection data based on the difference in the protection data.

15. The method of claim 10, wherein the filtering comprises multiple levels of filtering.

16. The method of claim 10, wherein the protection scheme includes a span type protection.

17. The method of claim 10, wherein the protection scheme includes a ring type protection.

18. The method of claim 10, wherein the protection scheme includes a mesh type protection.

19. A system for detecting changes in physical routes of connections within an optical switching network, the system comprising:
an event monitor operatively connected to a node layer of an optical switching network for receiving an event message from a node in the node layer where the event message relates to an event at the node, and the event comprises a connection event that relates to a specific connection that has an end point at the node;
an event filter operatively connected to the event monitor for filtering the event message to determine whether the event message may be ignored and for ignoring the event message if the event message does not pass the filtering; and
an event processor operatively connected to the event filter for processing the event message if the event message passes the filtering;
wherein the event filter retrieves of a latest logical path for the specific connection from the node, compares the latest logical path for the specific connection with a previously cached logical path for the specific connection to determine whether the latest logical path differs from the previously cached logical path, and indicates to the event processor that the filtering is passed if a difference in path is determined.

20. The system of claim 19, where the connection event comprises a subnetwork connection event.

21. The system of claim 20, wherein the subnetwork connection event comprises a creation event.

22. The system of claim 20, wherein the subnetwork connection event comprises a deletion event.

23. The system of claim 20, wherein the subnetwork connection event comprises an attribute change event.

24. The system of claim 19, wherein the event filter verifies that the event message is from an originating node for the specific connection.

25. The system of claim 19, wherein the event processor calculates a new physical route for the specific connection based on the difference in the path.

26. The system of claim 25, wherein the event processor sends a physical route change notification relating to the specific connection to at least one application.

27. The system of claim 25, wherein the event processor provides an update to the cached logical path for the specific connection based on the difference in the path.

28. A system for detecting changes in physical routes of connections within an optical switching network, the system comprising:
an event monitor operatively connected to a node layer of an optical switching network for receiving an event message from a node in the node layer where the event message relates to an event at the node, and the event comprises a protection event that relates to a protection scheme of the optical switching network;
an event filter operatively connected to the event monitor for filtering the event message to determine whether the event message may be ignored and for ignoring the event message if the event message does not pass the filtering; and
an event processor operatively connected to the event filter for processing the event message if the event message passes the filtering;
wherein the event filter retrieves a latest protection data from the node, compares the latest protection data with a previously cached protection data to determine whether the latest protection data differs from the previously cached protection data, and indicates that the filtering is passed if a difference in the protection data is determined.

29. The system of claim 28, wherein the event processor determines a subset of connections affected by the event if the filtering is passed.

30. The system of claim 29, wherein the event processor calculates new physical routes for the subset of connections based on the difference in the protection data.

31. The system of claim 30, wherein the event processor sends notification of the new physical routes to at least one application.

32. The system of claim 28, wherein the event processor provides an update to the cached protection data based on the difference in the protection data.

33. The system of claim 28, wherein the filtering comprises multiple levels of filtering.

34. The system of claim 28, wherein the protection scheme includes a span type protection.

35. The system of claim 28, wherein the protection scheme includes a ring type protection.

36. The system of claim 28, wherein the protection scheme includes a mesh type protection.

* * * * *